United States Patent
Nakase

[19]

[11] Patent Number: 6,100,611
[45] Date of Patent: Aug. 8, 2000

[54] ROTOR AND METHOD FOR MAKING SAME

[75] Inventor: Mitsunobu Nakase, Yonago, Japan

[73] Assignee: Nidec Corporation, Kyoto, Japan

[21] Appl. No.: 09/314,485

[22] Filed: May 18, 1999

Related U.S. Application Data

[62] Division of application No. 08/984,758, Dec. 4, 1997, Pat. No. 5,952,747.

[30] Foreign Application Priority Data

Dec. 6, 1996 [JP] Japan ...................................... 8-342554

[51] Int. Cl.[7] ............................. H02K 1/06; H02K 15/00; H02K 15/02; B29C 45/14
[52] U.S. Cl. .......................... 310/42; 310/43; 264/328.12
[58] Field of Search ................................ 310/42, 43, 261; 264/328.1, 328.3, 328.9, 328.12; 29/598

[56] References Cited

U.S. PATENT DOCUMENTS 3,333,300  8/1967  Cohan ................................... 264/328.9
4,781,879  11/1988 Oishi .................................. 264/328.12
5,363,003  11/1994 Harada et al. ........................ 310/67 R
5,952,747  9/1999  Nakase ..................................... 310/43

FOREIGN PATENT DOCUMENTS 5-57758    3/1993  Japan .
7-39093    2/1995  Japan .
9-239786   9/1997  Japan .

*Primary Examiner*—Clayton LaBalle
*Attorney, Agent, or Firm*—McCormick, Paulding & Huber LLP

[57] ABSTRACT

A rotor adapted for use in a motor and a fan. The rotor has a cup-shaped rotor body made of synthetic resin materials. A shaft is coaxially coupled with a bottom of the rotor body so as to expose a part of one end of the shaft to outside of the rotor body. And the bottom of the rotor body includes an annular recess coaxially formed with the shaft on an outer surface of the rotor body, an annular projection is coaxially formed with the shaft so as to surround the exposed portion of the shaft on the outer surface of the bottom of the rotor body. The exposed portion of the shaft and the annular projection are accommodated in the annular recess.

3 Claims, 4 Drawing Sheets

ROTOR AND METHOD FOR MAKING SAME

This is a divisional of application Ser. No. 08/984,758 filed on Dec. 4, 1997, now U.S. Pat. No. 5,952,747.

FIELD OF THE INVENTION

The present invention relates to a rotor made of a synthetic resin material, particularly, a rotor for use in a fan motor for cooling OA equipments and method for making the rotor by injection molding.

DESCRIPTION OF THE PRIOR ART

FIG. 4 shows a conventional motor used for a fan motor. In a rotor (a), six blades (b2) are integrally formed on the outer circumference of a cup-shaped portion (b1) of rotor body (b) with a constant interval in the circumferential direction, and a rotating shaft (c) that supports the rotor is mounted coaxially with the rotor body (b) at the central portion of the bottom of the cup-shaped portion (b1). The rotor body (b) and blades (b2) are made of a synthetic resin. To injection-mold the rotor (a), a melted synthetic resin is injected into a cavity between molds through a gate of the molds, with one end of the rotating shaft (c) located in the cavity, and after cooling and solidifying the synthetic resin, the rotor (a) is removed from the molds.

To smoothly fill the synthetic resin in the cavity without it being disturbed by the rotating shaft (c), the conventional rotor formed as described above is molded through three or more gates (d) disposed at circumferentially symmetrical positions around the rotating shaft (c). When the gates (d) are positioned in this manner, the synthetic resin, which flows into the cavity via each gate, flows in the circumferential direction as indicated by arrow (e) in the Figure. Each two flows of synthetic resin from adjacent gates encounter each other in the vicinity of the intermediate position between the adjacent gates. At such a encounter portion, however, the synthetic resins from both gates are unlikely to be uniformly mixed due to a temporal change such as cooling that occurs before the resin reaches the encounter portion, resulting in a discordant region, as shown by line L. In such a discordant region, deformation, a decrease in strength, or cracking may occur, or a change in loads may cause cracking when the rotor (a) is installed in the fan motor or while the fan motor is in operation.

In addition, if the gate (d) is provided near the position where the rotating shaft (c) is connected, the shaft obstructs the flow of the synthetic resin to cause the encounter of the flows of synthetic resin on the other side of the shaft, thereby preventing the resin from smoothly spreading around the rotating shaft (c), resulting in deterioration of adherence between the rotating shaft (c) and the rotor (a).

SUMMARY OF THE INVENTION

For solving the above-identified problems, the present invention provides a rotor made of a synthetic resin for a motor that prevents a synthetic resin in a molded rotor from becoming uniform due to the encounter of the flows of synthetic resin, thereby preventing deformation, a decrease in strength, cracking, or deterioration of adherence between a rotor and a shaft.

A synthetic resin rotor for a motor according to the present invention has a cup like shape and is molded with one end of the rotor being embedded in a rotor. The shaft extends within the rotor and at least one part of the shaft is exposed to the exterior. In addition, the rotor of the invention is characterized in that an annular protrusion that is a trace or scar of a gate part for injection of a synthetic resin is provided at the shaft fixing position of the rotor in such a way as to surround the part of the shaft in the rotor that is exposed to the exterior.

A method for making a rotor according to the present invention comprises the steps of positioning a shaft at a predetermined position within the mold, fixing one end of the shaft to a circular recess formed at the end of a center pin and filling a melted synthetic resin in the cavity of the mold through a filling gate which opens coaxially with the shaft. The synthetic resin radially spreads within the cavity around the shaft.

According to the rotor of the present invention, the synthetic resin radially spreads around the shaft, thereby preventing formation of discordant region due to the encounter of flows of the synthetic resin, as in the prior art. This configuration thus prevents deformation and a decrease in strength, and also prevents cracking caused by a change in loads when the rotor is installed in the fan motor or while the fan motor is in operation.

After cooling and solidifying the filled synthetic resin, the rotor is taken out of the molds, the shaft is removed from the center pin, and the excess synthetic resin that has been solidified in the vicinity of the filling-gate opening is cut off such that trace or scar of the cut-off resin is accommodated in a recess formed on the top of the rotor. The cutting trace or scar is then formed in that part of the rotor, that surrounds the exposed portion of the shaft.

In addition, according to the rotor of the present invention, since the synthetic resin that is being filled radially spreads around the shaft, it uniformly extends in the circumferential direction to prevent deterioration of adherence between the shaft and the synthetic resin of the rotor.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1b shows a partially enlarged cross-sectional view of the rotor as shown is FIG. 1a.

FIG. 2 shows a top plan view of the rotor as shown in FIG. 1a.

DETAILED DESCRIPTION OF THE PREFERRED EMBODIMENTS

Figure 1A:
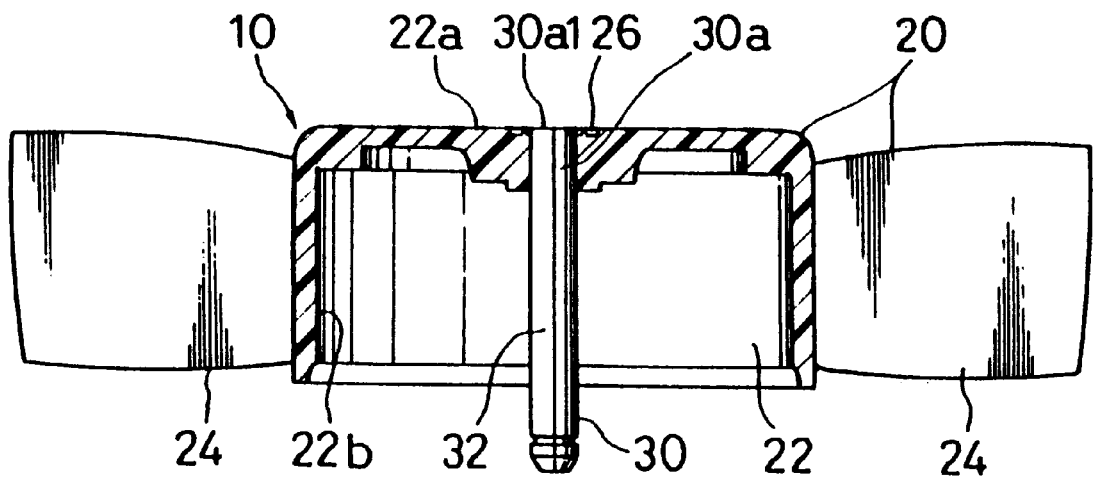
FIG. 1a shows a cross-sectional view of a rotor of the present invention.
Figure 1B:
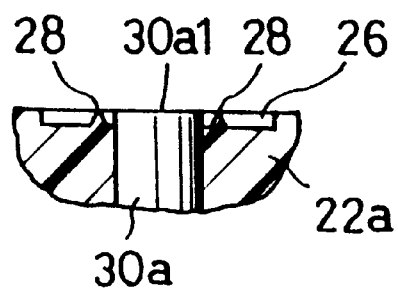
Figure 2:
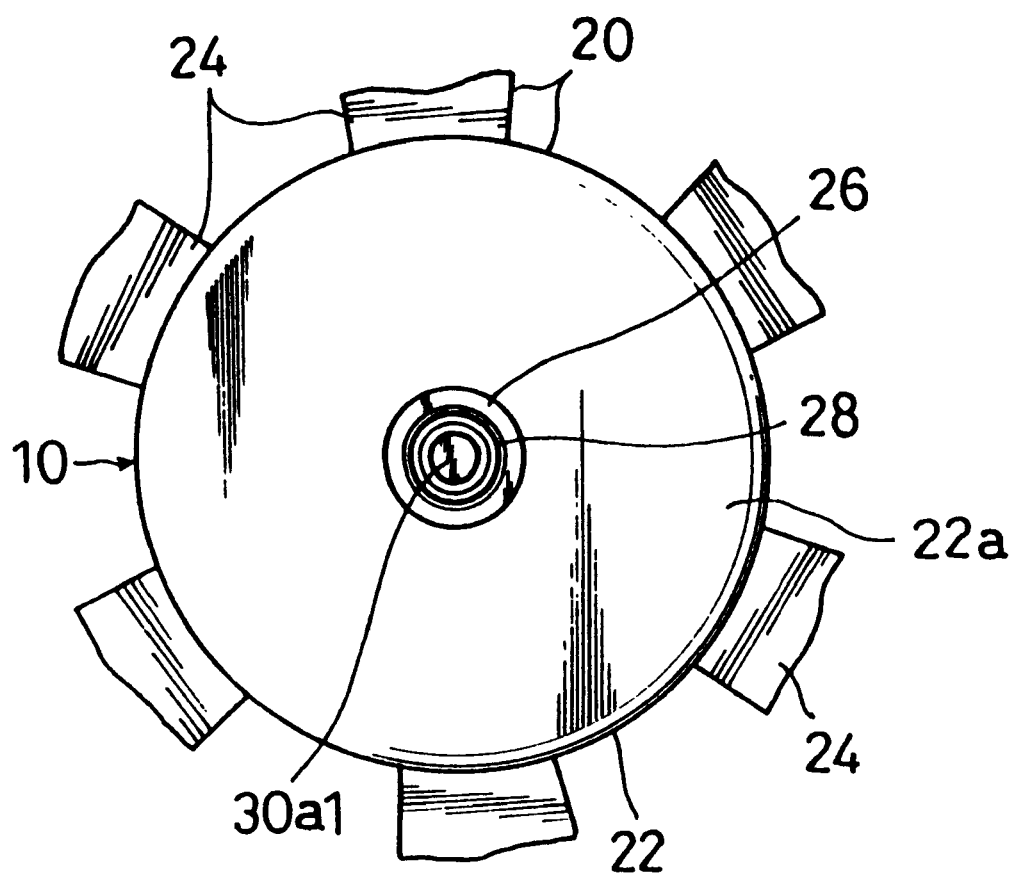
Figure 3:
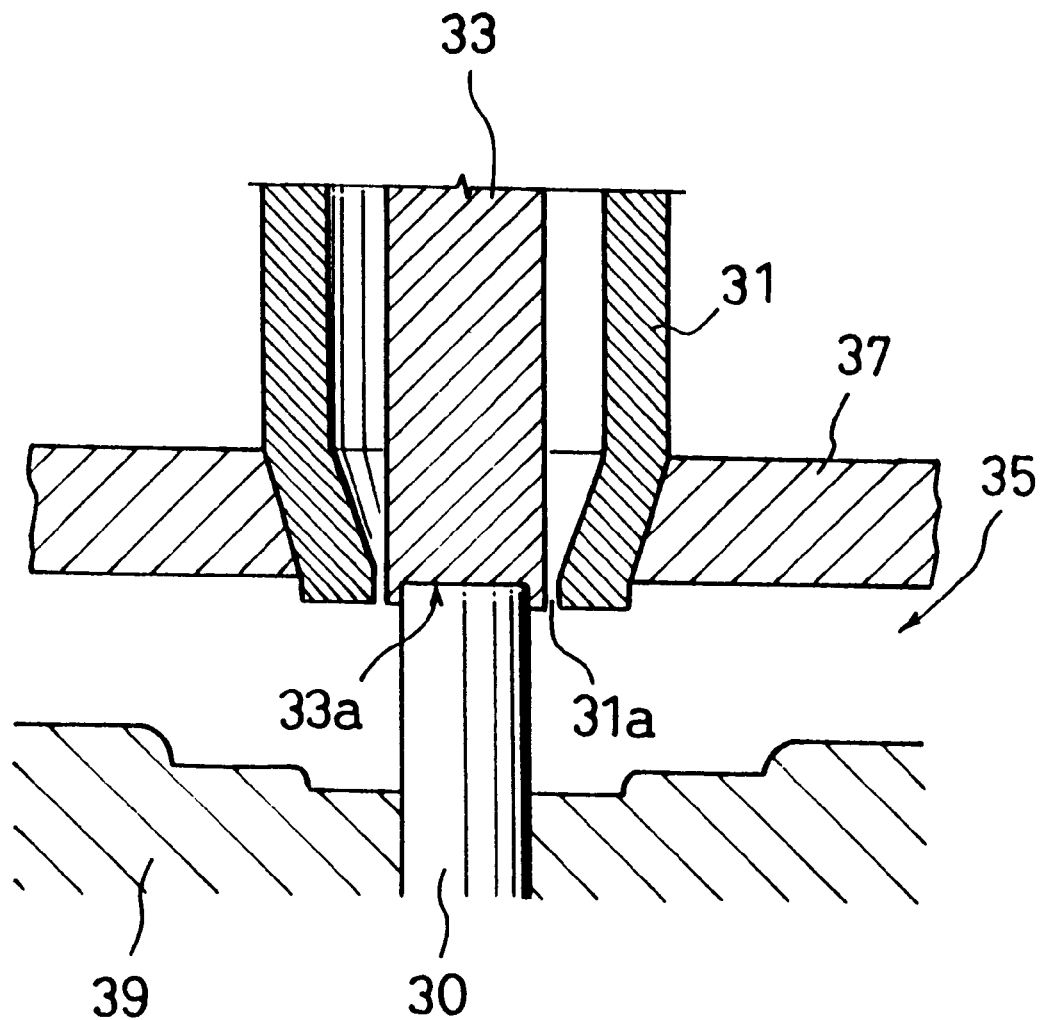
FIG. 3 is a partially enlarged cross-sectional view of a mold and a gate prior to the filling of a synthetic resin.
Figure 4:
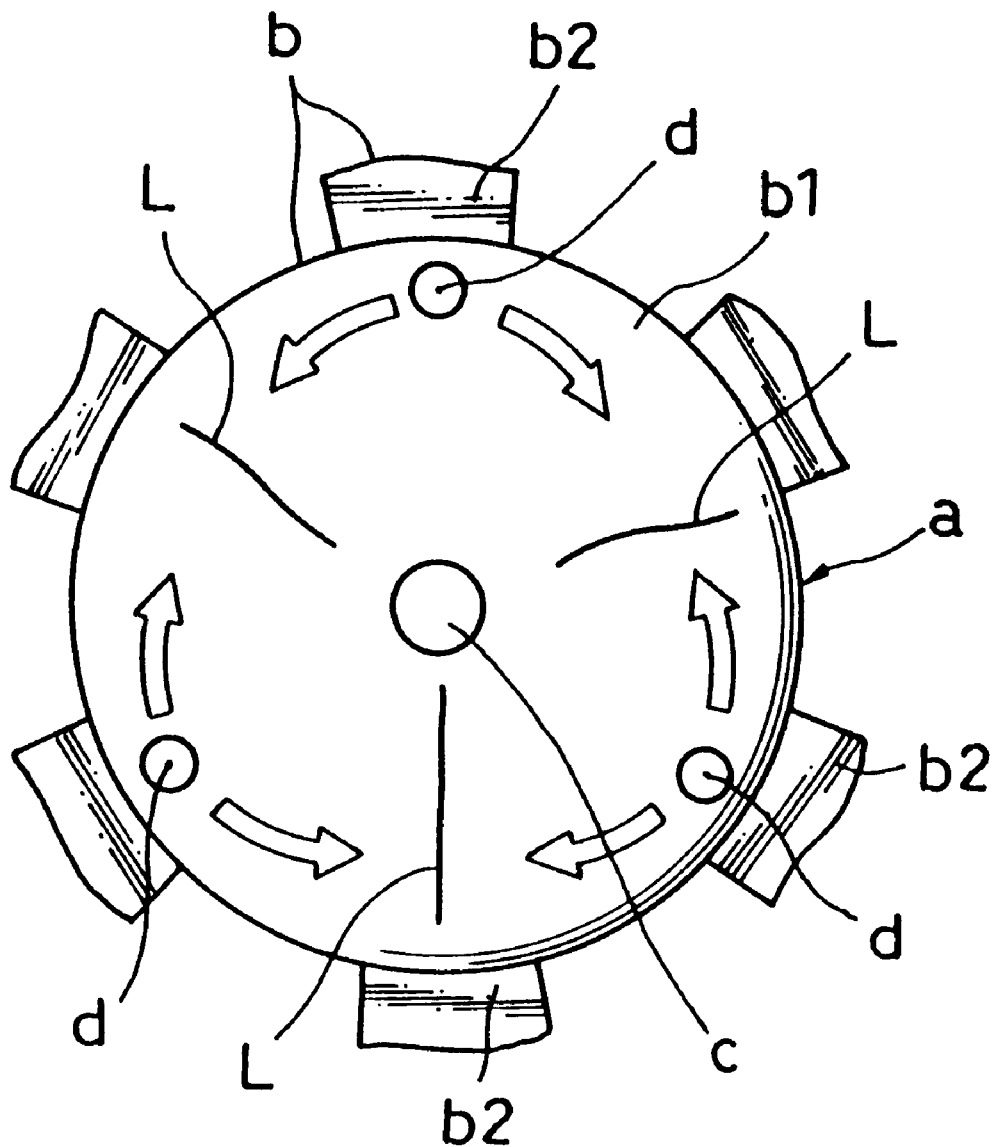
FIG. 4 shows a top plan view of a conventional rotor for use in a motor.

An embodiment of the present invention will be described below with reference to FIGS. 1 through 3. A rotor 10 has a rotor body 20 of a thermoplastic synthetic resin and a metallic shaft 30 coaxially fixed to the rotor body. The rotor body 20 includes six blades 24 on the outer peripheral portion of a cup-shaped portion 22 which opens downwardly in the FIG. 1a. One end 30a of the shaft 30 is embedded at the central portion of the bottom portion 22a (the upper part in FIGS. 1a and b) of the cup-shaped portion 22.

The other end of the shaft 30 opposite to the end 30a fixed to the rotor extends to the exterior of the cup-shaped portion 22, and the intermediate portion 32 of the shaft 30 is to be rotatably supported by a bearing of a fan motor (not shown). A recess 26 is coaxially formed on the outer surface (the upper part in FIGS. 1a and b) of the bottom portion 22a of the cup-shaped portion 22 and around the position where the shaft 30 is fixed.

The end face 30a1 of the fixed end 30a of the shaft 30 is exposed to the interior of the recess 26, and the cutting trace or scar of a synthetic resin solidified in the vicinity of a gate opening during injection molding angularly protrudes upwardly from the bottom of the recess 26 around the end 30a of the shaft 30 so as to be coaxial with the shaft 30.

Next, a method for molding the rotor 10 will be explained. With reference to FIG. 3, the shaft 30 is held at position by a lower mold 39. Gate 31 and its center pin 33 is associated with a upper mold 37 and the gate opening 33a opens to the cavity 35 in ring-shape coaxially with the shaft 30. The end 30a of the shaft 30 is fitted in the circular recess 33a formed at the tip of the center pin 33. This fitting may by accomplished by that first the shaft 30 is attached to the lower mold 39 and then the upper mold 37 is lowered to its predetermined position, bringing the center pin 33 into engagement with the shaft 30. With the arrangement as shown in FIG. 3, melted synthetic resin is injected through the gate opening 31a into the cavity 35 and filled therein.

The gate opening 31a for the molding according to the present invention, may be an annular ring shape or any other closed configuration. The cutting trace or scar according to the invention may have a shape of an annular ring or any other closed configuration.

The synthetic resin to be used in the present invention may be any resin material that can be used for injection molding, and is normally a thermoplastic resin but may be a thermosetting resin.

The synthetic resin, injected and filled in the cavity 35 through the gate opened to the cavity 35 coaxially with the shaft 30, radially spreads within the cavity 35 from the shaft area. Accordingly the flow of the melted synthetic resin is not obstructed by the shaft 30, so that the resin spreads uniformly around the shaft 30. The rotor molding method according to the present invention will not cause uniform mixture and discordant of resin at encountering area as caused in the prior art where the synthetic resin is injected and filled through separate gates which are located away from the shaft 30 and flows of the resin encounter each other. Thus, the rotor of the present invention is free from deformation of the rotor, a decrease in its strength, cracks therein, and degraded adhesion between the shaft and the synthetic resin. Furthermore, since the cavity 35 is rotationally symmetrical with respect to the axis of the shaft 30 by 60 degree, the melted synthetic resin that has been injected and is being filled in the cavity reach the terminal of the cavity 35 at substantially the same time. Thus, the cooling and solidification of the synthetic resin is almost uniform in the circumferential direction, so the rotor body 20 is very uniform in this direction and can be used as the rotor 10 that is rotated around the axis of the shaft 30.

Once the injected and filled synthetic resin has become hard in the cavity 35, the rotor 10 ejection-molded of the synthetic resin is took out of the molds and the excess synthetic resin hardened in the vicinity of the gate opening 31a is cut off from the rotor body 20. Then, the rotor 10 is finished which has an annular cutting trace or scar 28 protruding upwardly from the bottom of the recess 26 around the end 30a of the shaft 30 coaxially with the shaft 30. The depth of the recess 26 is set such that the cutting trace 28 do not extend beyond the top surface of the rotor body 20 and no adverse effects are produced even if the cutting trace 28 is not removed. When the cutting trace protrudes from the bottom of the recess 26, the depth of the recess 26 is preferably set at approximately 0.4 mm to 0.8 mm.

An axial flow fan motor can be obtained by mounting a rotor magnet inside the outer circumferential wall 22b of the cup-shaped portion 22 of the rotor 10 and supporting the shaft 30 by means of a bearing to rotatably support the rotor 10 with the rotor magnet opposing the outer circumference of a stator, as disclosed in U.S. Pat. No. 5,363,003. The disclosure of the U.S. patent is incorporated herein by reference.

The reference to up and down in the description of the embodiment is made with reference to the drawings only for purposes of explanation, and is not intended to limit the condition of the rotor in actual use.

The terms and expressions which have been employed in the foregoing specification are used therein as terms of description and not as terms of limitation, and there is no intention, in the use of such terms and expressions, of excluding the equivalents of the features shown and described or the portions thereof, it being recognized that the scope of the invention is defined and limited only by the claims which follow.

What is claimed is:

1. A method for making a rotor having a cup-shaped rotor body and coaxially coupled with a shaft so as to expose a part of one end of the shaft to outside of the rotor body comprising:

positioning the shaft at a predetermined portion within a cavity of a mold having a corresponding configuration with the rotor;

fixing the shaft to a center pin having an fixing hole for fixing an end of the shaft;

injecting a melting synthetic resin into the cavity through a gate coaxially surrounding the shaft fixing portion of the center pin and opening toward the cavity;

taking out the rotor from the cavity and cutting off an extra synthetic resin which is hardened in the vicinity of the opening of the gate.

2. A method of claim 1, wherein the marks of the cutting off the extra synthetic resin forms an annular projection coaxially formed with a shaft so as to surround the exposed portion of the shaft on an outer surface of a bottom portion of the rotor body.

3. A method of claim 2, wherein a part of the gate projects into the cavity and forms an annular recess on the outer surface of the bottom of the rotor body, the exposed portion of the shaft and the annular projection are accommodated in the annular recess.

* * * * *